(12) United States Patent
Song et al.

(10) Patent No.: US 12,492,651 B2
(45) Date of Patent: Dec. 9, 2025

(54) NON-METALLIC LUBRICANT PAN FOR A VEHICLE INCLUDING A STRUCTURAL REINFORCEMENT MEMBER

(71) Applicant: WAL Fuel Systems USA Inc., Livonia, MI (US)

(72) Inventors: Xiankai Song, Livonia, MI (US); Sami Siddiqui, Livonia, MI (US); Longhan Chen, Livonia, MI (US); Kuiwen Zhang, Livonia, MI (US)

(73) Assignee: WAL Fuel Systems USA Inc., Livonia, MI (US)

( * ) Notice: Subject to any disclaimer, the term of this patent is extended or adjusted under 35 U.S.C. 154(b) by 0 days.

(21) Appl. No.: 18/650,879

(22) Filed: Apr. 30, 2024

(65) Prior Publication Data
US 2025/0334064 A1  Oct. 30, 2025

(51) Int. Cl.
*F01M 11/00* (2006.01)

(52) U.S. Cl.
CPC . *F01M 11/0004* (2013.01); *F01M 2011/0012* (2013.01); *F01M 2011/002* (2013.01); *F01M 2011/0091* (2013.01)

(58) Field of Classification Search
CPC ....... F01M 11/0004; F01M 2011/0008; F01M 2011/002; F01M 2011/0012; F01M 2011/0037; F01M 2011/0087; F01M 2011/0091; F16H 57/0443; F16H 57/0453
See application file for complete search history.

(56) References Cited

U.S. PATENT DOCUMENTS

| | | | | |
|---|---|---|---|---|
| 2,938,601 | A * | 5/1960 | Brafford | F01M 11/065 184/6.2 |
| 6,845,743 | B1 * | 1/2005 | Bishop | F01M 11/0004 123/196 R |
| 2007/0221447 | A1 * | 9/2007 | Bicker | F01M 11/0004 184/106 |
| 2009/0020366 | A1 * | 1/2009 | Mori | F01M 5/001 184/106 |
| 2009/0145695 | A1 * | 6/2009 | Hiramatsu | F01M 11/0004 184/106 |
| 2010/0065014 | A1 * | 3/2010 | Dos Santos | F01M 11/064 123/196 R |
| 2010/0162988 | A1 * | 7/2010 | Enokida | F01M 11/0004 123/195 C |
| 2015/0252696 | A1 * | 9/2015 | Taguchi | F01M 11/0004 123/198 E |
| 2015/0300220 | A1 * | 10/2015 | Mordukhovich | F16H 57/0452 184/106 |
| 2019/0072014 | A1 * | 3/2019 | Hutchins | F01M 11/08 |
| 2024/0426237 | A1 * | 12/2024 | Bergman | F01P 11/14 |

FOREIGN PATENT DOCUMENTS

DE  102007030611 A1 *  4/2008  ......... F01M 11/0004
WO  WO-2011161339 A1 *  12/2011  ......... F01M 11/0004

* cited by examiner

*Primary Examiner* — Minh Truong
(74) *Attorney, Agent, or Firm* — Young Basile Hanlon & MacFarlane, P.C.

(57) ABSTRACT

A non-metallic lubricant pan for a vehicle that includes a body and a structural reinforcement member that is positioned within and secured to the body. The structural reinforcement member includes a drainage column that is generally aligned with a drain hole in the body and ribs that extend between the body and the drainage column such that the drainage column interconnects the ribs.

20 Claims, 7 Drawing Sheets

NON-METALLIC LUBRICANT PAN FOR A VEHICLE INCLUDING A STRUCTURAL REINFORCEMENT MEMBER

TECHNICAL FIELD

The present disclosure relates to vehicle lubrication and, more specifically, to the structural reinforcement of non-metallic lubricant pans.

BACKGROUND

In vehicles, oil is generally retained within a pan (or other such vessel) that is connected (secured) to (or otherwise supported by) the vehicle engine and lubricates the engine to increase efficiency and reduce operating temperature. In order to reduce weight and costs, many modern vehicles include non-metallic lubricant pans, which are approximately 30%-60% lighter than their metallic counterparts and eliminate secondary operations (e.g., welding, machining, sub-component attachment, etc.) as well as any need for rustproofing (e.g., coatings). Additionally, the molds used during the fabrication of non-metallic lubricant pans typically have a greater lifespan than those used during the fabrication of metallic lubricant pans, which further reduces costs.

Known non-metallic lubricant pans, however, sacrifice strength and/or durability. For example, whereas a metallic lubricant pan typically includes a natural frequency of approximately 50 Hz, non-metallic lubricant pans typically include a natural frequency of approximately 10 Hz.

The present disclosure addresses this shortcoming, however, by providing a reinforced non-metallic lubricant pan that capitalizes on the weight and the cost savings associated with the incorporation of non-metallic material(s) without sacrificing strength and/or durability.

SUMMARY

In one aspect of the present disclosure, a lubricant pan for a vehicle is disclosed that includes a body and a reinforcing web, wherein the body and the reinforcing web are formed from a non-metallic material.

The body is configured to retain a lubricant therein and includes a base wall and side walls that extend from the base wall. The base wall includes a drain hole and a receptacle, which is configured to receive an uptake pipe for a lubricant pump in the vehicle.

The reinforcing web is positioned within the body and is secured thereto. The reinforcing web includes a drainage column that is generally aligned with the drain hole and ribs that extend between the body and the drainage column such that the drainage column interconnects the ribs.

In certain embodiments, the lubricant pan may include a natural frequency that lies substantially within the range of approximately 90 Hz to approximately 130 Hz.

In certain embodiments the lubricant pan may be unitary in construction.

In certain embodiments, the ribs may include first ends that are connected to the side walls and second ends that are connected to the drainage column.

In certain embodiments, the drainage column may be spaced vertically from the base wall.

In certain embodiments, the reinforcing web may define drainage openings that are in communication with the drain hole to facilitate drainage of the lubricant pan.

In certain embodiments, the drainage openings may be positioned between adjacent ribs.

In certain embodiments, the ribs may be non-identical in configuration.

In certain embodiments, the ribs may include at least one first rib having a generally linear configuration and at least one second rib having a non-linear configuration.

In certain embodiments, the at least one second rib may extend about the receptacle.

In another aspect of the present disclosure, a lubricant pan for a vehicle is disclosed that includes a body and a reinforcing web.

The body is configured to retain a lubricant therein and includes a base wall and side walls that extend from the base wall, wherein the base wall includes a drain hole.

The reinforcing web is configured to increase the strength of the lubricant pan and includes ribs having first ends that are secured to the body and second ends that are positioned adjacent to the drain hole.

In certain embodiments, the lubricant pan may be formed from a non-metallic material.

In certain embodiments, the reinforcing web may define drainage openings that are in communication with the drain hole.

In certain embodiments, the drainage openings may be positioned between adjacent ribs.

In certain embodiments, the reinforcing web may further include a drainage column that is generally aligned with the drain hole and which interconnects the ribs at the second ends thereof such that the second ends of the ribs are spaced angularly about the drainage column.

In another aspect of the present disclosure, a lubricant pan for a vehicle is disclosed that includes a body and a structural reinforcement member.

The body is configured to retain a lubricant therein and includes a base wall and side walls that extend from the base wall, wherein the base wall includes a drain hole.

The structural reinforcement member is secured to the body and is configured to increase the strength of the lubricant pan. The structural reinforcement member defines drainage openings that are in communication with the drain hole to facilitate drainage of the lubricant pan.

In certain embodiments, the structural reinforcement member may include at least one first rib having a generally linear configuration and at least one second rib having a non-linear configuration.

In certain embodiments, the base wall may further include a receptacle that is configured to receive an uptake pipe for a lubricant pump in the vehicle.

In certain embodiments, the at least one second rib may extend about the receptacle.

In certain embodiments, the structural reinforcement member may further include a drainage column that interconnects the at least one first rib and the at least one second rib such that the drainage column is suspended within the body.

In certain embodiments, the drainage column may include at least one channel that extends therethrough to facilitate drainage of the lubricant pan.

BRIEF DESCRIPTION OF THE DRAWINGS

The disclosure is best understood from the following detailed description when read in conjunction with the accompanying drawings. It is emphasized that, according to common practice, the various features of the drawings may

DETAILED DESCRIPTION

The present disclosure describes a reinforced non-metallic lubricant pan for a vehicle. More specifically, the lubricant pan described herein includes a body that is configured to retain a lubricant therein and an internal structural reinforcement member (i.e., a reinforcing web) that is configured to increase the strength (e.g., rigidity, durability) of the lubricant pan.

Figure 1:
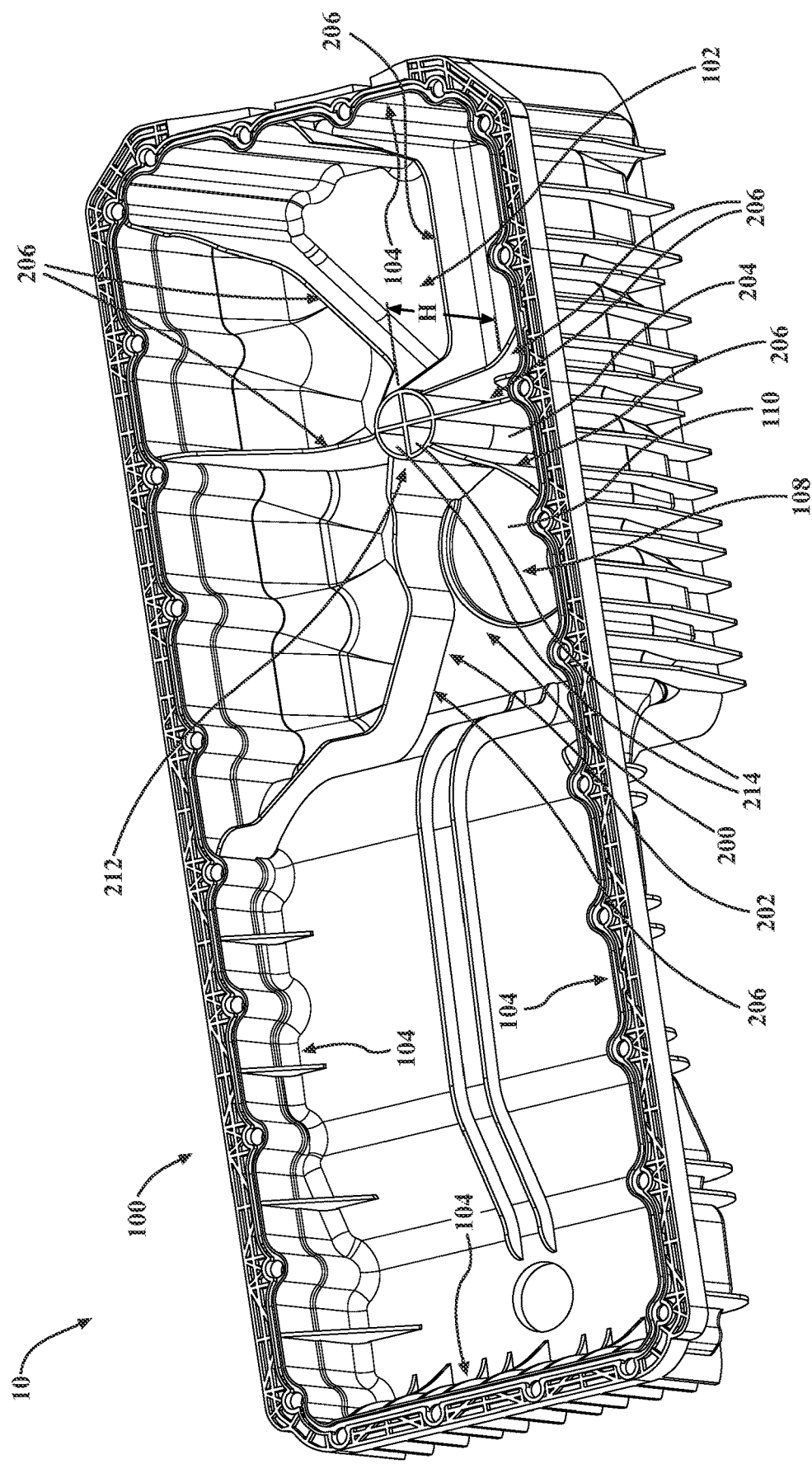
FIG. 1 is a top, perspective view of a lubricant pan according to one embodiment of the present disclosure.
Figure 2:
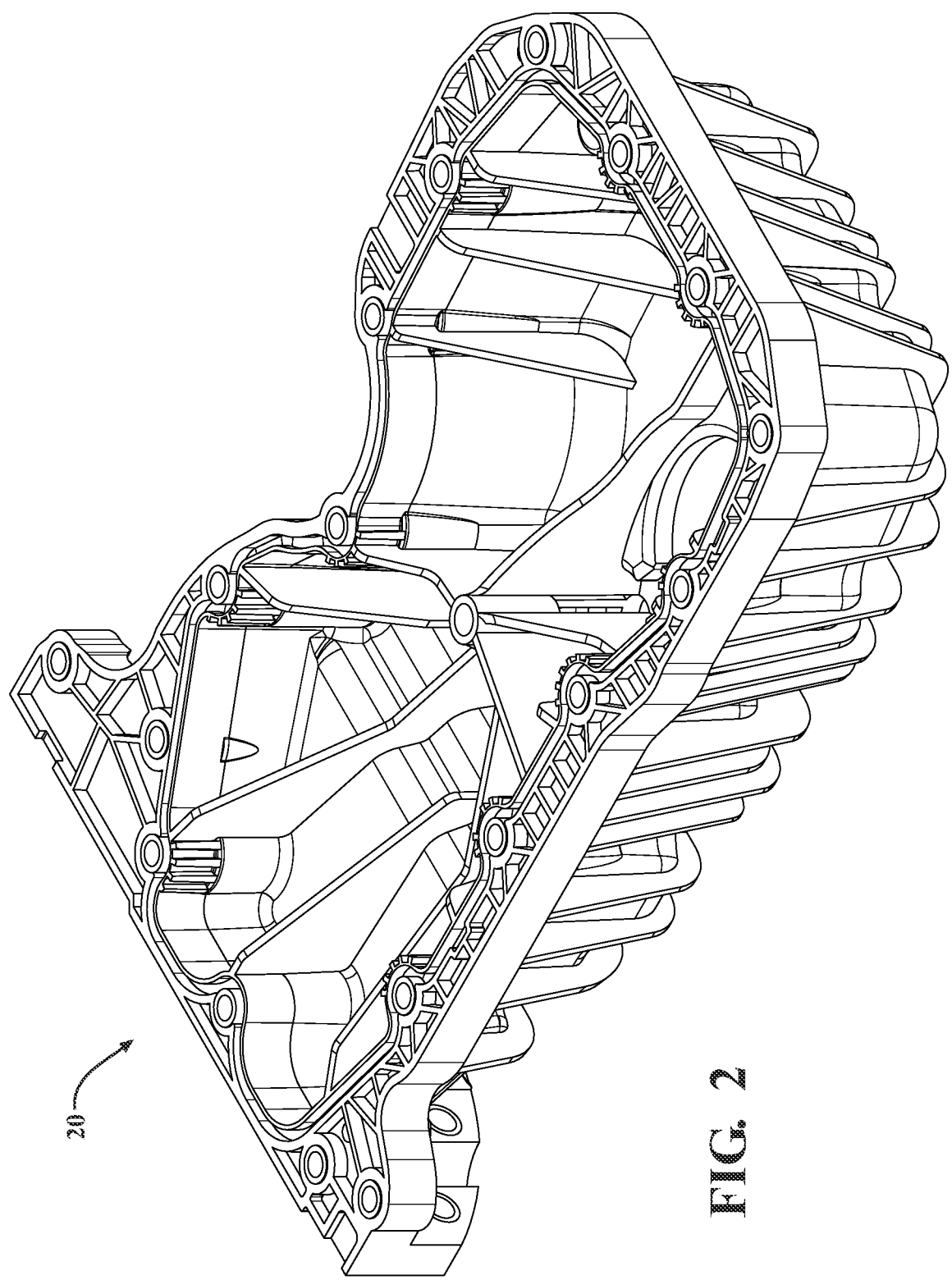
FIG. 2 is a top, perspective view of an alternate embodiment of the lubricant pan seen in FIG. 1.
Figure 3:
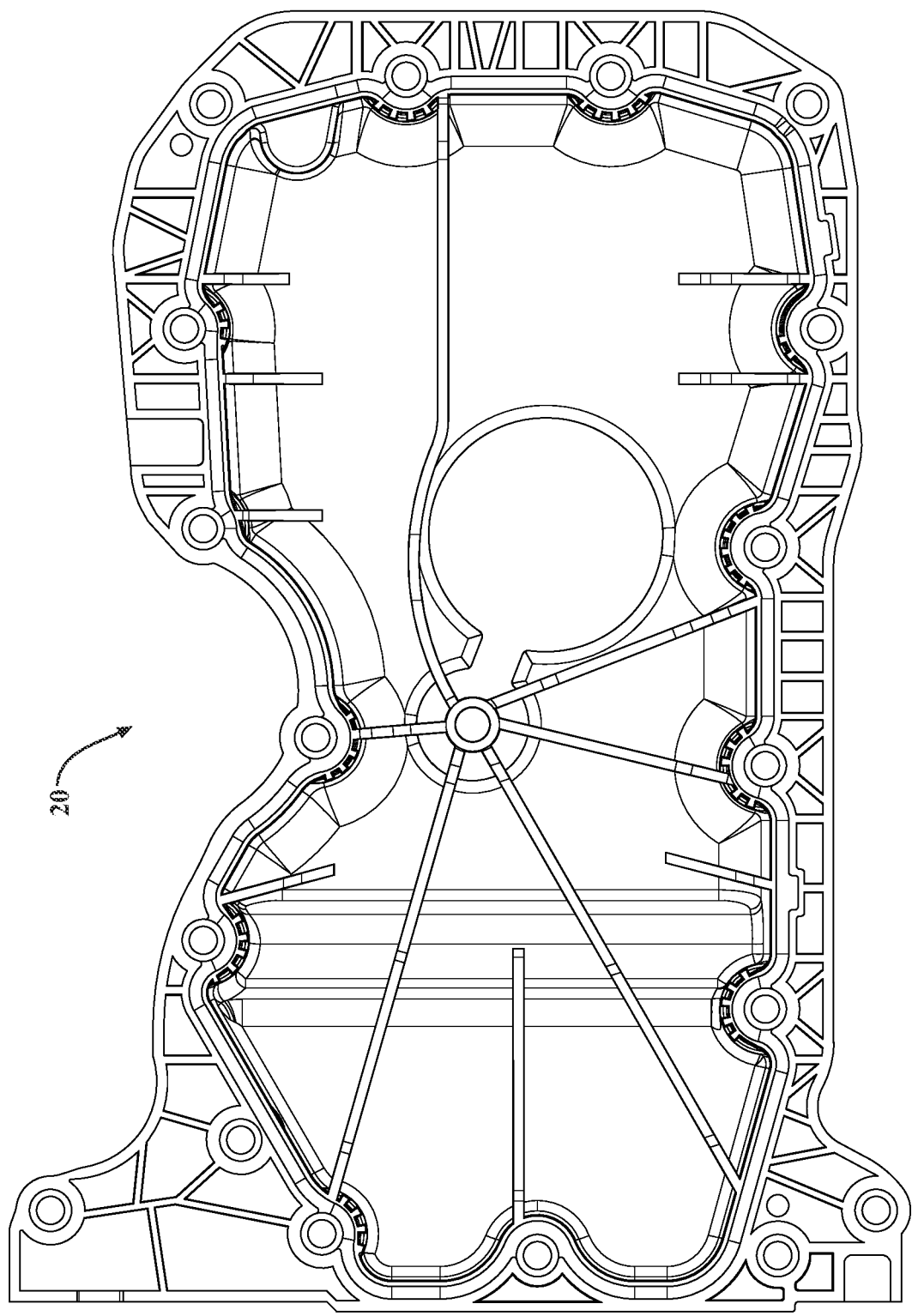
FIG. 3 is a top, plan view of the lubricant pan seen in FIG. 2.
Figure 4:
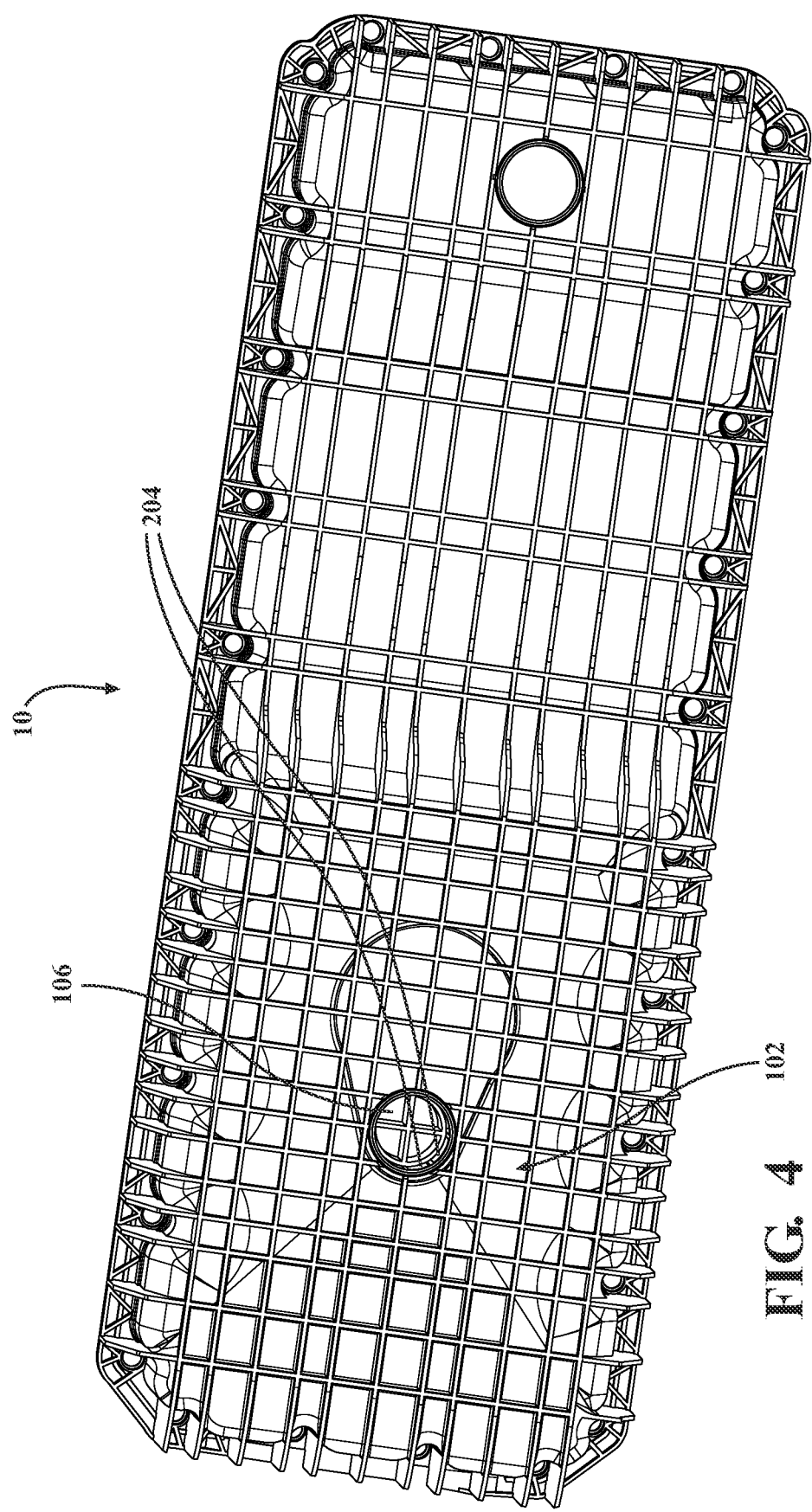
FIG. 4 is a bottom, perspective view of the lubricant pan seen in FIG. 1.
Figure 5:
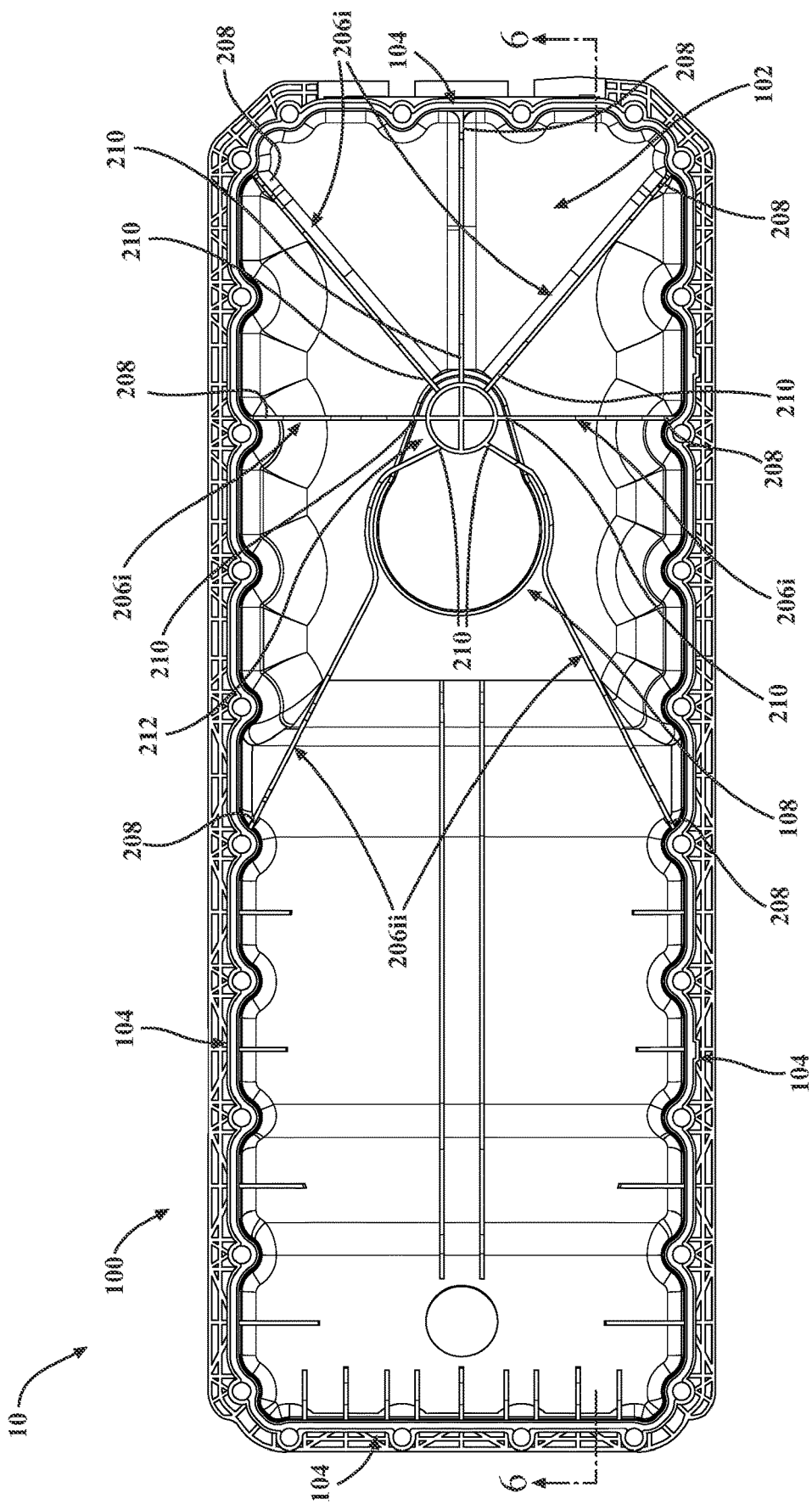
FIG. 5 is a top, plan view of the lubricant pan seen in FIG. 1.

With reference now to FIG. 1, a (reinforced) lubricant pan 10 is illustrated that includes: a body 100 and a structural reinforcement member 200, which is configured as a reinforcing (strengthening) web 202. It is envisioned that the lubricant pan 10 may be configured for use with a wide variety of vehicles including, for example, passenger vehicles, trucks, buses, vans, boats, airplanes, etc., and that the particular configuration thereof may be altered accordingly. For example, FIGS. 2 and 3 illustrate an alternate embodiment of the lubricant pan 10, which is identified by the reference character 20 and is configured for use with another vehicle.

Referring again to FIG. 1, the lubricant pan 10 includes (i.e., is formed from) one or more non-metallic materials (e.g., one or more plastic materials, one or more polymeric materials, and/or one or more composite materials) and may be formed through any suitable method of manufacture (e.g., injection molding, casting, etc.). The utilization of non-metallic material(s) allows for an increase in the capacity of the lubricant pan 10 as well as reductions in the size (footprint), the cost, and the weight thereof vis-à-vis a metallic (e.g., steel) lubricant pan. For example, as a result of the non-metallic construction, it is envisioned that the lubricant pan 10 may include a capacity that lies substantially within the range of approximately 40 L to approximately 60 L (e.g., approximately 50 L) with an associated weight that lies substantially within the range of approximately 10 kg to approximately 14 kg (e.g., approximately 12 kg). Embodiments in which the capacity and/or the weight of the lubricant pan 10 may lie outside of the disclosed range are also envisioned herein (e.g., depending upon the particular configuration of the lubricant pan 10, the particular vehicle with which the lubricant pan 10 is associated, the particular material(s) utilized in construction of the lubricant pan 10, etc.), however, and would not be beyond the scope of the present disclosure.

In the illustrated embodiment, the lubricant pan 10 is unitary (monolithic) in construction, whereby the body 100 and the structural reinforcement member 200 (i.e., the reinforcing web 202) are integrally formed from a single piece of non-metallic material. Embodiments in which one or more components of the lubricant pan 10 may be formed as separate, discrete structures are also envisioned herein, however, and would not be beyond the scope of the present disclosure.

With reference now to FIGS. 4-7 as well, the body 100 is configured to retain (store) a lubricant therein and includes a base wall 102 and a plurality of side walls 104 that extend (vertically) from the base wall 102. Although generally illustrated and described as being configured to retain oil therein, it is envisioned that the body 100 may be adapted to retain any substance (or combination of substances) that is suitable for the intended purpose of lubricating the engine in a vehicle.

The base wall 102 includes (defines) a drain hole 106 (FIG. 4) that extends therethrough to permit drainage of the lubricant pan 10 and a receptacle 108 (FIG. 1) (i.e., a recess 110) that extends into the base wall 102. The receptacle 108 is configured to receive an uptake pipe 300 (FIG. 6) for a lubricant pump in the vehicle, which circulates lubricant through the engine, such that the uptake pipe 300 seats (nests) within the receptacle 108.

The reinforcing web 202 is positioned (located) internally within the body 100 and is secured thereto. The reinforcing web 202 not only reduces undesirable movement (e.g., sloshing, burbling, etc.) of lubricant within the lubricant pan 10, which inhibits (if not entirely prevents) splash onto the lubricant pump, but increases the strength (e.g., rigidity, durability) of the lubricant pan 10 (i.e., vis-à-vis known non-metallic lubricant pans). For example, during testing, whereas a similar lubricant pan that is devoid of the reinforcing web 202 included (displayed, defined) a natural frequency of approximately 10 Hz, the lubricant pan 10 included (displayed, defined) a natural frequency that lies substantially within the range of approximately 90 Hz to approximately 130 Hz (e.g., approximately 110 Hz). Embodiments in which the natural frequency of the lubricant pan 10 may lie outside of the disclosed range are also envisioned herein (e.g., depending upon the configuration of the lubricant pan 10, the particular material(s) utilized in construction of the lubricant pan 10, the volume of the lubricant pan 10, etc.), however, and would not be beyond the scope of the present disclosure.

The reinforcing web 202 defines a plurality (series) of drainage openings 204 (FIGS. 1, 4) that are in communication with the drain hole 106 to facilitate drainage of the lubricant pan 10, as described in further detail below, and includes a plurality (series) of ribs 206 (FIGS. 1, 5) having (first, outer and second, inner) ends 208, 210 and a drainage column 212.

The ribs 206 extend (laterally, radially) between the body 100 and the drainage column 212. In the illustrated embodiment, the ends 208 of the ribs 206 are connected (secured) to the side walls 104 and/or the base wall 102, and the ends 210 are positioned adjacent to the drain hole 106 (FIG. 4) and are connected (secured) to the drainage column 212 such that the drainage column 212 interconnects the ribs 206. Embodiments of the lubricant pan 10 in which the ends 208 of the ribs 206 may terminate short of the side walls 104 (i.e., such that the ribs 206 are secured (connected) exclusively to the base wall 102) are also envisioned herein, however, and would not be beyond the scope of the present disclosure.

Figure 6:
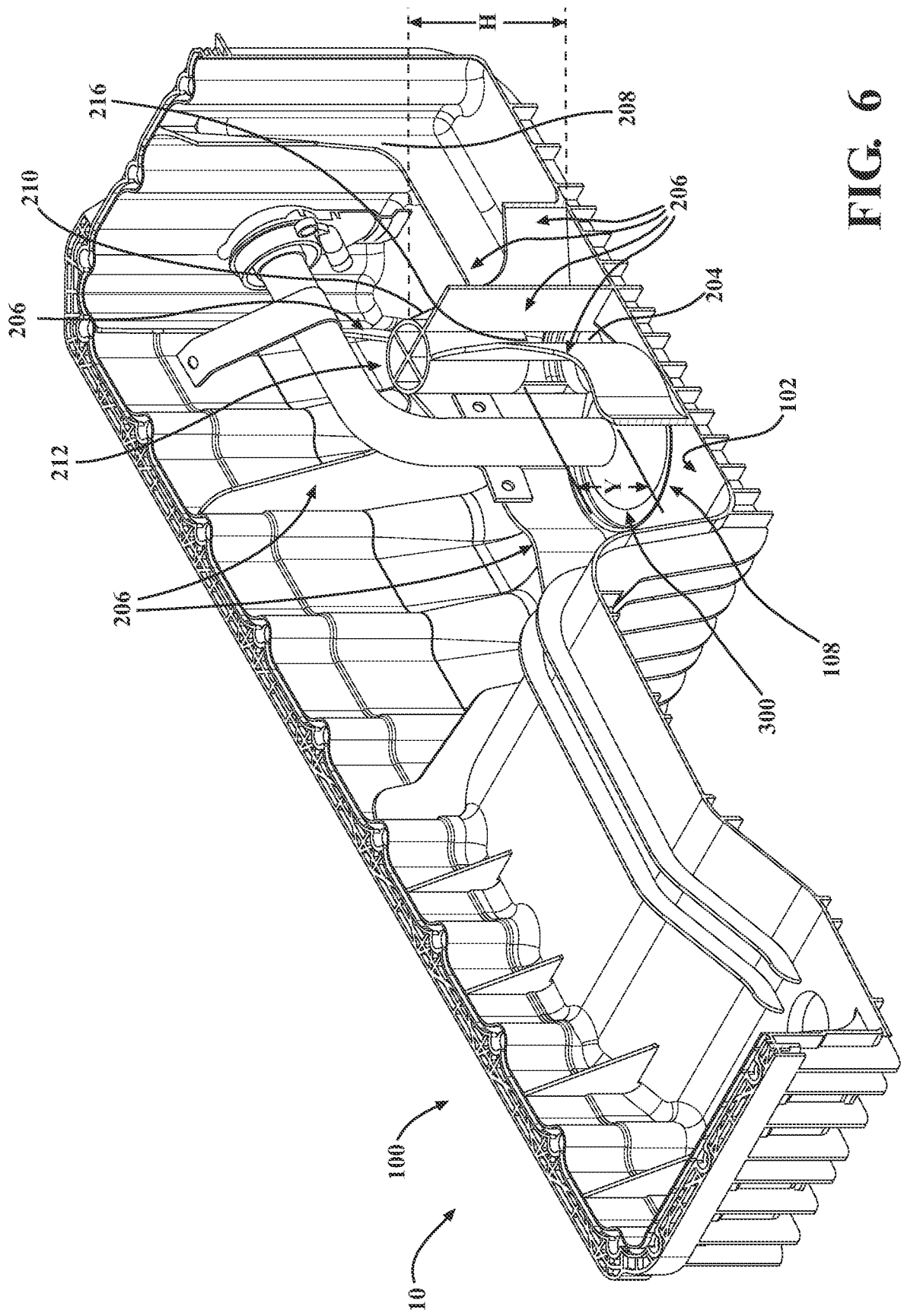
FIG. 6 is a cross-sectional view taken along line 6-6 in FIG. 5 and shown with an uptake pipe for a lubricant pump in the vehicle.
Figure 7:
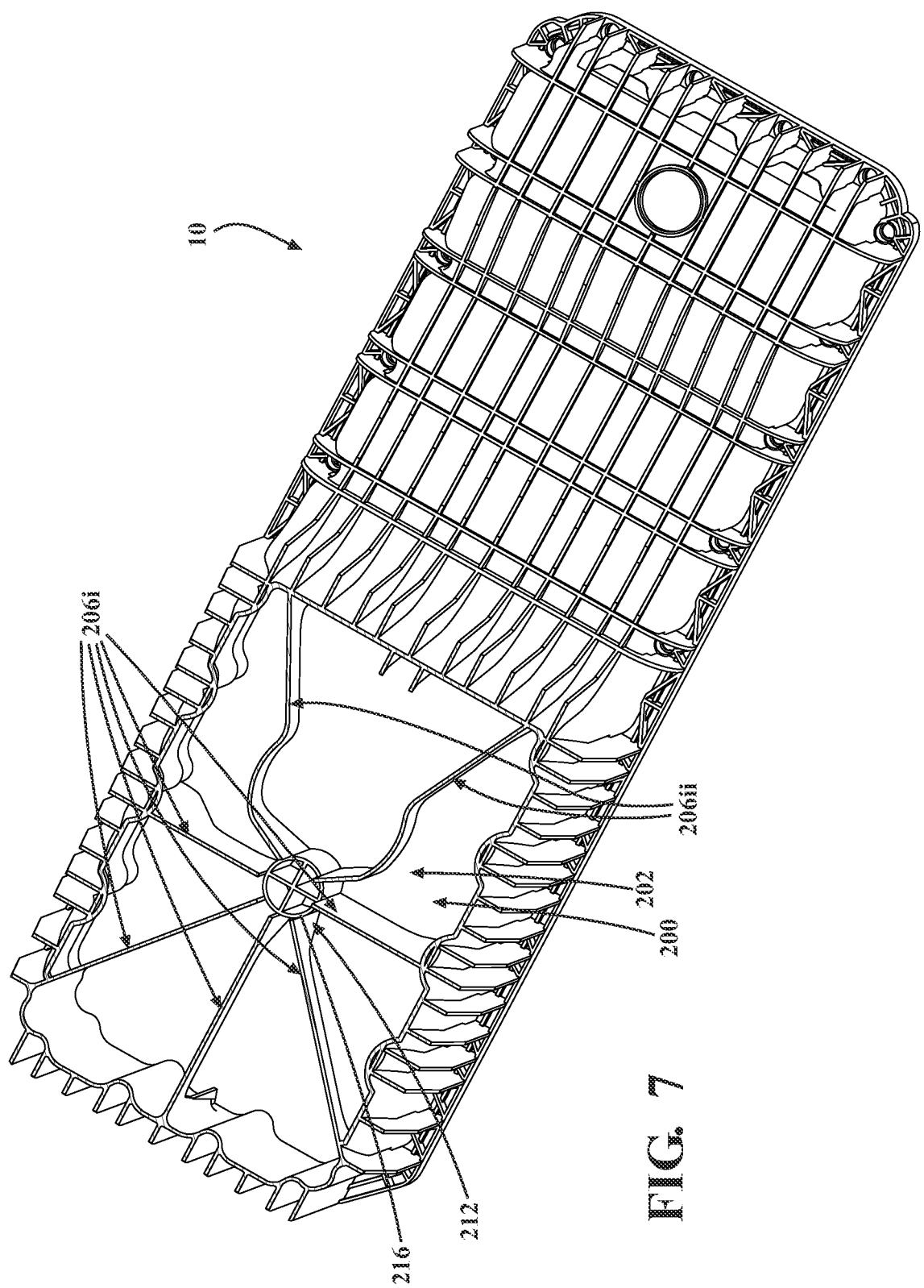
FIG. 7 is a partial, bottom, perspective view of the lubricant pan seen in FIG. 1.

As seen in FIGS. 1 and 6, the ribs 206 each define a non-uniform height H. More specifically, the height H of each rib 206 increases towards the ends 208, 210 thereof such that the ends 208, 210 of each rib 206 are tapered in configuration. Embodiments in which the ribs 206 may each include a uniform H are also envisioned herein, however, and would not be beyond the scope of the present disclosure.

The tapered configuration at the ends 208, 210 of the ribs 206 increases the surface area that is available for contact with the body 100 (i.e., the side walls 104) and the drainage column 212, respectively, and enhances the connection therebetween. Additionally, it is envisioned that the variable height H of each rib 206 may allow the ribs 206 to avoid various components of the vehicle (e.g., the uptake pipe 300, the crank shaft, the lubricant return ports, etc.) so as not to interfere with the placement and/or the operation thereof.

In various embodiments of the disclosure, depending upon the particular configuration of the lubricant pan 10, the configuration and/or the location of the uptake pipe 300, etc., it is envisioned that the ribs 206 may be identical or non-identical in configuration. For example, it is envisioned that the lubricant pan 10 may include (one or more) at least one (first) rib 206$i$ (FIGS. 5, 7) with a generally linear configuration and (one or more) at least one (second) rib 206$ii$ with a non-linear configuration that includes one or more curves, bends, twists, etc., which allow the rib(s) 206$ii$ to avoid (accommodate) various components of the vehicle (e.g., the crank shaft, lubricant return ports, etc.) so as not to interfere with the placement and/or the operation thereof. More specifically, in the illustrated embodiment, the lubricant pan 10 (i.e., the reinforcing web 202) includes five the ribs 206$i$ and two ribs 206$ii$, which extend about the receptacle 108 (i.e., such that the ribs 206$ii$ include (arcuate) sections with inner contours that match (mirror) an outer contour of the receptacle 108) so as not to interfere with the placement and/or the operation of the uptake pipe 300 (FIG. 6). Embodiments in which the number of ribs 206$i$, 206$ii$ may be increased or decreased would not be beyond the scope of the present disclosure (e.g., depending upon the particular configuration of the lubricant pan 10, the arrangement of the various components of the vehicle, etc.), however. For example, embodiments of the lubricant pan 10 that include a single rib 206$i$ or a single rib 206$ii$ are also envisioned herein, as are embodiments in which the lubricant pan 10 may exclusively include the ribs 206$i$ or the ribs 206$ii$, and would not be beyond the scope of the present disclosure.

The drainage column 212 is generally aligned with the drain hole 106 (FIG. 4) and includes (defines) (one or more) at least one channel 214 (FIG. 1) that extends therethrough, which further facilitates the drainage of the lubricant pan 10. Although shown as including four channels 214 in the illustrated embodiment, it is envisioned that the particular number of channels 214 may be increased or decreased (e.g., depending upon the capacity of the lubricant pan 10, the necessary or desired flow rate, etc.) without departing from the scope of the present disclosure.

As indicated above, the drainage column 212 interconnects the ribs 206 (i.e., the ribs 206$i$ (FIG. 5) and the ribs 206$ii$) at the ends 210 thereof, whereby the ribs 206 extend outwardly (laterally, radially) from the drainage column 212 (i.e., towards the side walls 104). The ends 210 of the ribs 206 are spaced angularly (circumferentially) from each other about the drainage column 212 and are connected (secured) thereto such that the drainage column 212 is suspended within the body 100, as seen in FIG. 6. More specifically, the ends 210 of the ribs 206 support the drainage column 212 such that a lower end 216 thereof is spaced vertically from the base wall 102 by a distance Y, whereby the ribs 206 and the drainage column 212 collectively define the drainage openings 204.

The drainage openings 204 are positioned (located) between adjacent ribs 206, whereby the ribs 206 collect and direct lubricant towards the drainage openings 204 and the drain hole 106 in order to facilitate drainage of the lubricant pan 10. Depending upon the particular configuration of the lubricant pan 10, the necessary or desired flow rate, the capacity of the lubricant pan 10, etc., it is envisioned that the drainage openings 204 may be either identical or non-identical in configuration. Additionally, it is envisioned that the particular configuration(s) of the drainage openings 204 may be varied (i.e., by varying the angular spacing between the ends 210 of the ribs 206 and/or the distance Y) in order to alter the flow of lubricant therethrough and thereby achieve any necessary or desired flow rate.

In the illustrated embodiment, the lubricant pan 10 includes seven ribs 206 (i.e., five ribs 206$i$ and two ribs 206$ii$) and six drainage openings 204. It is envisioned, however, that the particular number of ribs 206 and drainage openings 204 may be increased or decreased in alternate embodiments (e.g., depending upon the particular configuration of the lubricant pan 10, the necessary or desired flow rate, the capacity of the lubricant pan 10, etc.), however, without departing from the scope of the present disclosure.

Persons skilled in the art will understand that the various embodiments of the disclosure described herein and shown in the accompanying figures constitute non-limiting examples, and that additional components and features may be added to any of the embodiments discussed herein above without departing from the scope of the present disclosure. Additionally, persons skilled in the art will understand that the elements and features shown or described in connection with one embodiment may be combined with those of another embodiment without departing from the scope of the present disclosure and will appreciate further features and advantages of the presently disclosed subject matter based on the description provided. Variations, combinations, and/or modifications to any of the embodiments and/or features of the embodiments described herein that are within the abilities of a person having ordinary skill in the art are also within the scope of the disclosure, as are alternative embodiments that may result from combining, integrating, and/or omitting features from any of the disclosed embodiments.

Use of broader terms such as "comprises," "includes," and "having" should be understood to provide support for narrower terms such as "consisting of," "consisting essentially of," and "comprised substantially of." Accordingly, the scope of protection is not limited by the description set out above but is defined by the claims that follow and includes all equivalents of the subject matter of the claims.

In the preceding description, reference may be made to the spatial relationship between the various structures illustrated in the accompanying drawings, and to the spatial orientation of the structures. However, as will be recognized by those skilled in the art after a complete reading of this disclosure, the structures described herein may be positioned and oriented in any manner suitable for their intended purpose. Thus, the use of terms such as "above," "below," "upper," "lower," "inner," "outer," "left," "right," "upward," "downward," "inward," "outward," etc., should be understood to describe a relative relationship between the structures and/or a spatial orientation of the structures. Those skilled in the art will also recognize that the use of such terms may be provided in the context of the illustrations provided by the corresponding figure(s).

Additionally, terms such as "approximately," "generally," "substantially," and the like should be understood to allow for variations in any numerical range or concept with which they are associated and encompass variations on the order of 25% (e.g., to allow for manufacturing tolerances and/or deviations in design). For example, the term "generally parallel" should be understood as referring to configurations in with the pertinent components are oriented so as to define an angle therebetween that is equal to 1800±25% (e.g., an angle that lies within the range of (approximately) 135° to (approximately) 225°) and the term "generally orthogonal" should be understood as referring to configurations in with the pertinent components are oriented so as to define an angle therebetween that is equal to 90°±25% (e.g., an angle that lies within the range of (approximately) 67.5° to (approximately) 112.5°). The term "generally parallel" should thus be understood as referring to encompass configurations in which the pertinent components are arranged in parallel relation, and the term "generally orthogonal" should thus be understood as referring to encompass configurations in which the pertinent components are arranged in orthogonal relation.

Although terms such as "first," "second," "third," etc., may be used herein to describe various operations, elements, components, regions, and/or sections, these operations, elements, components, regions, and/or sections should not be limited by the use of these terms in that these terms are used to distinguish one operation, element, component, region, or section from another. Thus, unless expressly stated otherwise, a first operation, element, component, region, or section could be termed a second operation, element, component, region, or section without departing from the scope of the present disclosure.

Each and every claim is incorporated as further disclosure into the specification and represents embodiments of the present disclosure. Also, the phrases "at least one of A, B, and C" and "A and/or B and/or C" should each be interpreted to include only A, only B, only C, or any combination of A, B, and C.

What is claimed is:

1. A lubricant pan for a vehicle, the lubricant pan comprising:
   a body configured to retain a lubricant therein, wherein the body includes:
      a base wall including:
         a drain hole; and
         a receptacle configured to receive an uptake pipe for a lubricant pump in the vehicle; and
      side walls extending from the base wall; and
   a reinforcing web positioned within the body and secured thereto, wherein the reinforcing web includes:
      a drainage column generally aligned with the drain hole; and
      ribs extending vertically from the base wall and radially outward from the drainage column such that the drainage column interconnects the ribs, wherein the body and the reinforcing web are formed from a non-metallic material.

2. The lubricant pan of claim 1, wherein the lubricant pan includes a natural frequency during operation of the vehicle substantially within a range of approximately 90 Hz to approximately 130 Hz.

3. The lubricant pan of claim 1, wherein the lubricant pan is unitary in construction.

4. The lubricant pan of claim 1, wherein the ribs include first ends connected to the side walls and second ends connected to the drainage column.

5. The lubricant pan of claim 4, wherein the drainage column is spaced vertically from the base wall.

6. The lubricant pan of claim 5, wherein the reinforcing web defines drainage openings in communication with the drain hole to facilitate drainage of the lubricant pan.

7. The lubricant pan of claim 6, wherein the drainage openings are positioned between adjacent ribs.

8. The lubricant pan of claim 1, wherein the ribs are non-identical in configuration.

9. The lubricant pan of claim 8, wherein the ribs include:
   at least one first rib having a generally linear configuration; and
   at least one second rib having a non-linear configuration.

10. The lubricant pan of claim 9, wherein the at least one second rib extends about the receptacle.

11. A lubricant pan for a vehicle, the lubricant pan comprising:
    a body configured to retain a lubricant therein, wherein the body includes:
       a base wall including a drain hole; and
       side walls extending from the base wall; and
    a reinforcing web configured to increase strength of the lubricant pan, wherein the reinforcing web includes ribs extending vertically from the base wall and radially outward from the drain hole.

12. The lubricant pan of claim 11, wherein the lubricant pan is formed from a non-metallic material.

13. The lubricant pan of claim 11, wherein the reinforcing web defines drainage openings in communication with the drain hole.

14. The lubricant pan of claim 13, wherein the drainage openings are positioned between adjacent ribs.

15. The lubricant pan of claim 11, wherein the reinforcing web further includes:
    a drainage column generally aligned with the drain hole and interconnecting the ribs such that the ribs are spaced angularly about the drainage column.

16. A lubricant pan for a vehicle, the lubricant pan comprising:
    a body configured to retain a lubricant therein, wherein the body includes:
       a base wall including a drain hole; and
       side walls extending from the base wall; and
    a structural reinforcement member secured to the body and configured to increase strength of the lubricant pan, wherein the structural reinforcement member defines drainage openings in communication with the drain hole to facilitate drainage of the lubricant pan and includes at least one rib extending vertically from the base wall and radially outward from the drain hole.

17. The lubricant pan of claim 16, wherein the at least one rib includes:
    at least one first rib having a generally linear configuration; and
    at least one second rib having a non-linear configuration.

18. The lubricant pan of claim 17, wherein the base wall further includes:
    a receptacle configured to receive an uptake pipe for a lubricant pump in the vehicle, wherein the at least one second rib extends about the receptacle.

19. The lubricant pan of claim 17, wherein the structural reinforcement member further includes:
    a drainage column interconnecting the at least one first rib and the at least one second rib such that the drainage column is suspended within the body.

20. The lubricant pan of claim 19, wherein the drainage column includes at least one channel extending therethrough to facilitate drainage of the lubricant pan.

* * * * *